United States Patent
Nádas et al.

(10) Patent No.: US 12,418,486 B2
(45) Date of Patent: Sep. 16, 2025

(54) MARKER GRAPH FOR HQoS

(71) Applicant: Telefonaktiebolaget LM Ericsson (publ), Stockholm (SE)

(72) Inventors: Szilveszter Nádas, Santa Clara, CA (US); Sándor Laki, Budapest (HU); Gergo Gombos, Budapest (HU); Ferenc Fejes, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 6 days.

(21) Appl. No.: 18/273,887

(22) PCT Filed: Mar. 30, 2021

(86) PCT No.: PCT/IB2021/052666
§ 371 (c)(1),
(2) Date: Jul. 24, 2023

(87) PCT Pub. No.: WO2022/208135
PCT Pub. Date: Oct. 6, 2022

(65) Prior Publication Data
US 2024/0098028 A1 Mar. 21, 2024

(51) Int. Cl.
*H04L 47/24* (2022.01)
*H04L 45/302* (2022.01)
*H04W 72/543* (2023.01)

(52) U.S. Cl.
CPC ............ *H04L 47/24* (2013.01); *H04L 45/302* (2013.01); *H04W 72/543* (2023.01)

(58) Field of Classification Search
CPC .............................. H04L 47/24; H04L 45/302
See application file for complete search history.

(56) References Cited

U.S. PATENT DOCUMENTS

| | | | |
|---|---|---|---|
| 2010/0278190 A1* | 11/2010 | Yip | ........................ H04L 47/623 370/412 |
| 2015/0117220 A1 | 4/2015 | Turanyi et al. | |

(Continued)

FOREIGN PATENT DOCUMENTS

| | | | | |
|---|---|---|---|---|
| CN | 102640457 B | * | 1/2015 | ........... H04L 47/522 |
| WO | 2016007053 A1 | | 1/2016 | |

(Continued)

OTHER PUBLICATIONS

Laki, S. et al., "Core-Stateless Forwarding With QoS Revisited: Decoupling Delay and Bandwidth Requirements" IEEE/ACM Transactions on Networking, vol. 29 No. 2, Apr. 2021, pp. 503-516, IEEE.

(Continued)

*Primary Examiner* — David R Lazaro
*Assistant Examiner* — Mariegeorges A Henry
(74) *Attorney, Agent, or Firm* — COATS & BENNETT, PLLC

(57) ABSTRACT

Methods and apparatus for packet marking for a Hierarchical Quality of Service (HQoS) is provided to control resource sharing among a plurality of network flows with differentiated services. A packet marker at a single point (e.g., gateway) encodes the resource sharing policy for a plurality of packet flows into a single packet value. The HQoS policy is then realized by using simple PPV schedulers at the bottlenecks in the network.

11 Claims, 17 Drawing Sheets

(56) References Cited

U.S. PATENT DOCUMENTS

| | | | |
|---|---|---|---|
| 2016/0105369 A1 | 4/2016 | Nadas et al. | |
| 2018/0048551 A1* | 2/2018 | Lee | H04L 43/04 |
| 2020/0127933 A1 | 4/2020 | Nadas et al. | |
| 2020/0382427 A1* | 12/2020 | Nádas | H04L 47/2441 |
| 2021/0409335 A1 | 12/2021 | Zhu | |
| 2023/0198910 A1 | 6/2023 | Tourrilhes et al. | |

FOREIGN PATENT DOCUMENTS

| | | |
|---|---|---|
| WO | 2018188770 A1 | 10/2018 |
| WO | 2019141380 A1 | 7/2019 |
| WO | 2020229905 A1 | 11/2020 |

OTHER PUBLICATIONS

Nadas, S., et al., "Per Packet Value: A Practical Concept for Network Resource Sharing", IEEE Global Communications Conference (GLOBECOM), Dec. 2016, pp. 1-7.

Adams, R., "Active Queue Management: A Survey", IEEE Communications Survey & Tutorials, vol. 15, No. 3, Third Quarter 2013, pp. 1425-1476, IEEE.

* cited by examiner

Code Listing 1: HQoS Packet Marking

Input: TA Index $i$
Marker graph $G(V, E)$
Operator policy as TVF $f()$
Output: Packet value $v$ 1 begin
2    Let $s \in V$ be the starting node;
3    $r \leftarrow random(0, S_i)$;
4    $m, l \leftarrow adj(s, i)$;
5    while $m$ is not the ending node do:
6       $r \leftarrow apply(m, l)$;
7       $m, l \leftarrow adj(m)$;
8    $v = f(r)$
9    Return $v$

FIG. 6

Code Listing 2: SP Marking Component for n subflows

Input: Input port $i \in [1,n]$ (priority order)
Rate parameter $r_{in} \in [0, S_i]$ Output: Transformed rate $r_{out} \in [0, \sum_{k=1}^{n} S_k]$ 1 begin
2 $\quad r_{out} = L_{i-1} + r_{in}$
3 Return $r_{out}$

FIG. 7

Code Listing 3: WFQ Marking Component for $n$ subflows

Input:   TA index $i \in [1, n]$
         Rate parameter $r \in [0, S_i]$
Output:  Transformed rate $r_{tr} \in [0, \sum_{k=1}^{n} S_k]$ 1  begin
2     Find $i \in [1, n]$, such that $o_i = i$;
3     Find $j \in [1, i]$, such that $R_{j-1,i} < r \leq R_{j,i}$;
4     $r_{tr} \leftarrow B_{j-1} + (r - R_{j-1,i}) / W_{j,i}$

FIG. 8

Code Listing 4: Update for SP Marking Component

Input: Input port $i \in [1, n]$ (priority order)
TA Rate Measurements $[S_1, S_2, ..., S_n]$ 1 begin
2     $L_0 \leftarrow 0$
3     for $i \leftarrow 1$ to $n-1$ do
4        $L_i \leftarrow L_{i-1} + S_i$

FIG. 9

Code Listing 5: Update for WFQ Marking Component

Input: TA Rate Measurements $[S_1, S_2, \ldots, S_n]$

```
1  begin
2    Calculate ordered-indexing: o_1, ..., o_n;
3    Note: S_{o_j} / w_{o_j} ≤ S_{o_j'} / w_{o_j'} ((j < j') ∧ j, j' ∈ [0, n];
4    B_0 = 0;
5    for i ← 1 to n do
6      R_{0,i} ← 0;
7    for j ← 1 to n do
8      for i ← j to n do
9        W_{j,i} ← w_{o_i} / ∑_{k=j}^{n} w_{o_k};
10   for j ← 1 to n do
11     δ_j ← (S_{o_j} − R_{j−1,j}) / W_{j,j};
12     B_j ← B_{j−1} + δ_j;
13     for i ← j to n do
14       R_{j,i} ← R_{j−1,i} + δ_j × W_{j,i};
```

FIG. 10

MARKER GRAPH FOR HQoS

TECHNICAL FIELD

The present disclosure relates generally to resource sharing among a plurality of packet flows and, more particularly, to a packet marking for implementing Hierarchical Quality of Service (HQoS) to control resource sharing and quality of service (QoS) for a plurality of packet flows.

BACKGROUND

Communication networks are shared among a wide variety of applications and services with different requirements. Some applications require low latency and high throughput while other applications and services require best effort only. At the same time, sharing of network resources by different operators is becoming more common. Network slicing is a solution for sharing resources between operators that can also accommodate the widely varying Quality of Service (QoS) requirements of different users. The general idea underlying network slicing is to separate traffic into multiple logical networks that share the same physical infrastructure. Each logical network is designed to serve a specific purpose and comprises all the network resources required for that specific purpose. Network slices can be implemented for each operator and for each service provided by the operator.

The heterogenous traffic mix comprising different flows for different users carried by different network operators and with different QoS requirements poses a challenge for access aggregation networks (AANs). The network needs to ensure that network resources are shared fairly between different flows while maintaining the required QoS for each flow. Without some form of direct resource sharing control, the result will be unfairness in the treatment of different flows.

Most networks rely on a few simple mechanisms to approximate flow fairness. For example, Transmission Control Protocol (TCP) has some limited congestion control mechanisms built in. Despite these existing mechanisms, new congestion controls and heterogenous Round Trip Times (RTTs) often result in unfairness among flows anyway. Further, these limited mechanisms are often unable to prevent user with several flows from dominating resource usage over a single bottleneck.

Another simple approach that attempts to ensure that certain traffic is provided with at least a minimum level of QoS is by implementing a static reservation solution. Static reservation traditionally requires defining in advance the bitrate share of each user's combined traffic. Because users often have highly variable utilization, a static reservation approach often results in high amounts of unused resources.

In comparison to these legacy approaches, Hierarchical Quality of Service (HQoS) by Scheduling, a technique for resource sharing and QoS management, can implement a richer and more complex set of resource sharing policies. HQoS uses a scheduler and many queues to implement and enforce a resource sharing policy among different traffic aggregates (TAs) and among different flows within a TA. The HQoS approach organizes managed elements of the network into a hierarchy and applies QoS rules at each level of the hierarchy in order to create more elaborate, refined, and/or sophisticated QoS solutions for shared resource management. With HQoS, resource sharing can be defined among several TAs at different hierarchical levels, e.g., among operators, network slices, users and subflows of a user. HQoS can also be used to realize statistical multiplexing of a communication link.

HQoS is complex and requires configuration at each bottleneck in a network. With the evolution of Fifth Generation (5G) networks and optical fiber for the last hop, bottlenecks will become more likely at network routers. The traffic at these routers is heterogenous considering congestion control mechanisms and round trip time (RTT). The traffic mix is also constantly changing. Controlling resource sharing at these bottlenecks can significantly improve network performance and perceived QoS.

A technique that is often used in conjunction with HQoS is known as packet marking. Packet marking involves adding information to a packet for potential use by downstream devices and/or processing. For example, an edge router may use packet marking to insert a packet value (PV) into a packet that indicates that packet's importance in the traffic mix at the edge of the network. The PV may then be used by schedulers in other network nodes along the path traversed by the packet to ensure that the packet is prioritized based on its PV as it traverses the network towards its destination. Packet marking has proven to be a useful technique to enable effective bandwidth sharing control and traffic congestion avoidance within a network.

A core stateless resource sharing mechanism called Hierarchical Per Packet Values (HPPV) implements HQoS by only modifying packet marking algorithms without any changes to the schedulers in the network nodes. In this approach, the resource sharing policies between different TAs are defined by the packet marking strategy. No knowledge of the resource sharing policies is required by the scheduler. With this approach, HQoS can be implemented with a simple scheduler that determines the handling of a packet based only on its PV. An advantage of this approach is that new policies can be introduced by reconfiguring packet marking without making any changes to the scheduler.

A related application titled "HQoS Marking For Many Sublows" discloses a method of packet marking for a HQoS scheme that ensures weighted fairness among a plurality of subflows in a TA. This application is incorporated herein in its entirety by reference. Currently, there is no known method of marking packets in a manner that ensures weighted fairness among different flows at more than two hierarchical layers.

SUMMARY

The present disclosure relates generally to packet marking for a Hierarchical Quality of Service (HQoS) to control resource sharing among a plurality of packet flows with differentiated services. A packet marker at a single point (e.g., gateway) encodes the resource sharing policy for a plurality of packet flows into a single packet value. The HQoS policy is then realized by using simple PPV schedulers at the bottlenecks in the network.

To implement packet marking for HQoS, a hierarchy of weighted fair queuing (WFQ) and strict priority (SP) marker components are organized into a marker graph. Other types of marker components could also be used. The marker graph includes a source node, a plurality of intermediate nodes corresponding to the SP and WFQ marker components, and a marker node. The intermediate nodes are referred to herein as rate transformation nodes. The source node of the marker graph determines a random bitrate for a packet flow. That random bitrate is routed through the marker graph from the source node through one or more rate transformation nodes to the marker node. The random rate is transformed at each rate transformation node according to the existing WFQ and SP components. The marker node uses the transformed rate received as input to the final marker node to determine the packet value.

A first aspect of the disclosure comprises methods of marking packets with a packet value to implement HQoS. In one embodiment, the method comprises obtaining an Aggregate Throughput Value Function (ATVF) that maps throughput values to packet values for a plurality of packet flows. The method further comprises obtaining a marker graph that encodes resource sharing policies for a Hierarchical Quality of Service (HQoS) hierarchy for the plurality of packet flows as sequences of rate transformations. Each sequence of rate transformations corresponds to a path of one of said packet flows through the marker graph from a source node through one or more rate transformation nodes to a marker node. The method further comprises receiving a packet associated with one of said packet flows and marking the packet with a packet value based on a selected path through the marker graph and the ATVF.

A second aspect of the disclosure comprises a network node configured to perform packet marking to implement HQoS. In one embodiment, the network node is configured to obtain an Aggregate Throughput Value Function (ATVF) that maps throughput values to packet values for a plurality of packet flows. The network node is further configured to obtain a marker graph that encodes resource sharing policies for a Hierarchical Quality of Service (HQoS) hierarchy for the plurality of packet flows as sequences of rate transformations. Each sequence of rate transformations corresponds to a path of one of said packet flows through the marker graph from a source node through one or more rate transformation nodes to a marker node. The network node is further configured to receive a packet associated with one of said packet flows and marking the packet with a packet value based on a selected path through the marker graph and the ATVF.

A third aspect of the disclosure comprises a network node configured to perform packet marking to implement HQoS. The network node comprises interface circuitry for receiving and sending packets and processing circuitry. The processing circuitry is configured to obtain an Aggregate Throughput Value Function (ATVF) that maps throughput values to packet values for a plurality of packet flows. The processing circuitry is further configured to obtain a marker graph that encodes resource sharing policies for a Hierarchical Quality of Service (HQoS) hierarchy for the plurality of packet flows as sequences of rate transformations. Each sequence of rate transformations corresponds to a path of one of said packet flows through the marker graph from a source node through one or more rate transformation nodes to a marker node. The processing circuitry is further configured to receive a packet associated with one of said packet flows and marking the packet with a packet value based on a selected path through the marker graph and the ATVF.

A fourth aspect of the disclosure comprises a computer program comprising executable instructions that, when executed by a processing circuitry in a network node, causes the network node to perform the method according to the first aspect.

A fifth aspect of the disclosure comprises a carrier containing a computer program according to the fourth aspect, wherein the carrier is one of an electronic signal, optical signal, radio signal, or computer readable storage medium.

BRIEF DESCRIPTION OF THE DRAWINGS

FIG. 6 illustrates exemplary pseudocode for packet marking at a single point to implement HQoS.

FIG. 7 illustrates exemplary pseudocode for rate transformation by a rate transformation node implementing SP scheduling.

FIG. 8 illustrates exemplary pseudocode for rate transformation by a rate transformation node implementing WFQ scheduling.

FIG. 9 illustrates exemplary pseudocode for updating a rate transformation node implementing SP scheduling.

FIG. 10 illustrates exemplary pseudocode for updating a rate transformation node implementing WFQ scheduling.

DETAILED DESCRIPTION

Figure 1:
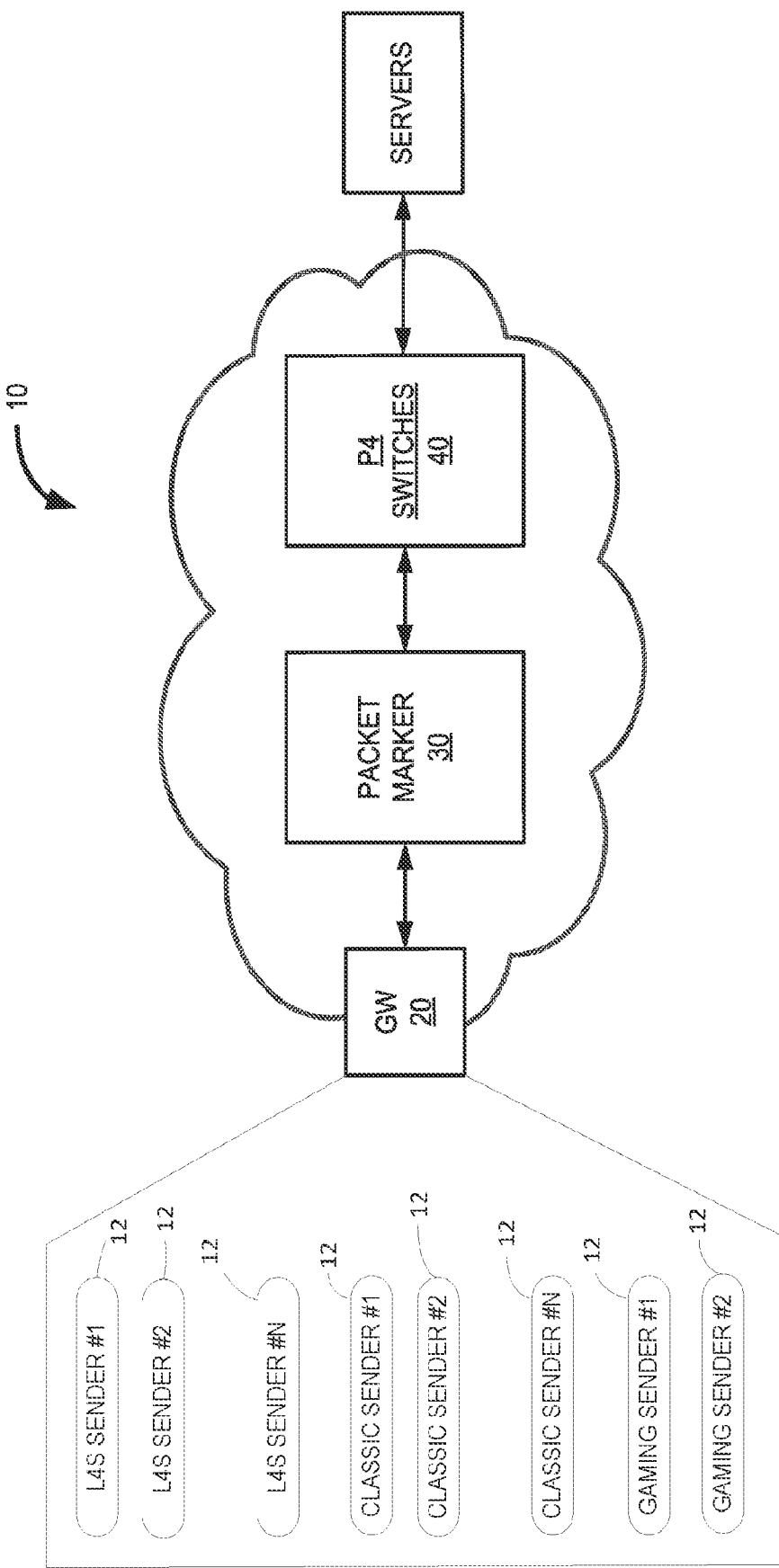
FIG. 1 illustrates an AAN implementing HQoS as herein described.

Referring now to the drawings, the present disclosure will be described in the context of an access aggregation network (AAN) 10 implementing HQoS. Those skilled In the art will appreciate, however, that the disclosed embodiment is presented for purposes of explanation and the principles herein described are more generally applicable to other networks implementing HQoS.

As shown in FIG. 1, packets comprising a multitude of different packet flows from a multitude of different sources 12 and with varying QoS requirements arrive a gateway 20 of the AAN 10. The packets may be any of a variety of different types. Examples of the most common types of packets include Internet Protocol (IP) packets (e.g., Transmission Control Protocol (TCP) packets), Multiprotocol Label Switching (MPLS) packets, and/or Ethernet packets. Among other things, the packets may comprise one or more fields for storing values used by the network 10 in performing packet processing (e.g., deciding whether to forward, queue, or drop packets). These fields may be in either a header or payload section of the packet, as may be appropriate.

The gateway 20 classifies the packets and a packet marker 30 assigns a packet value (PV) to each packet according to its relative importance. Though shown separately, a packet marker 30 may be located at the gateway 20. Also, there may be multiple packet markers 30 located at different network nodes. The packets are forwarded through a series of switches or routers 40 towards their respective destinations. When congestion is detected, the switches 40 at the bottlenecks implement a congestion control mechanism to drop some packets in order to alleviate the congestion. Generally, a scheduler at the switch determines what packets to forward and what packets to drop based on the PV assigned to the packet by the packet marker 30. Generally, packets with a higher PV are less likely to be dropped than packets with a lower PV.

In exemplary embodiments described herein, a packet marking strategy is used to implement HQoS. HQoS is a technology for implementing complex resource sharing policies in a network through a queue scheduling mechanism. The HQoS scheme ensures that all packet flows will be allocated resources during periods of congestion according to policies established by the operator so that packet flows of relatively low importance are not starved during periods of congestion by packet flows of higher importance.

Figure 2:
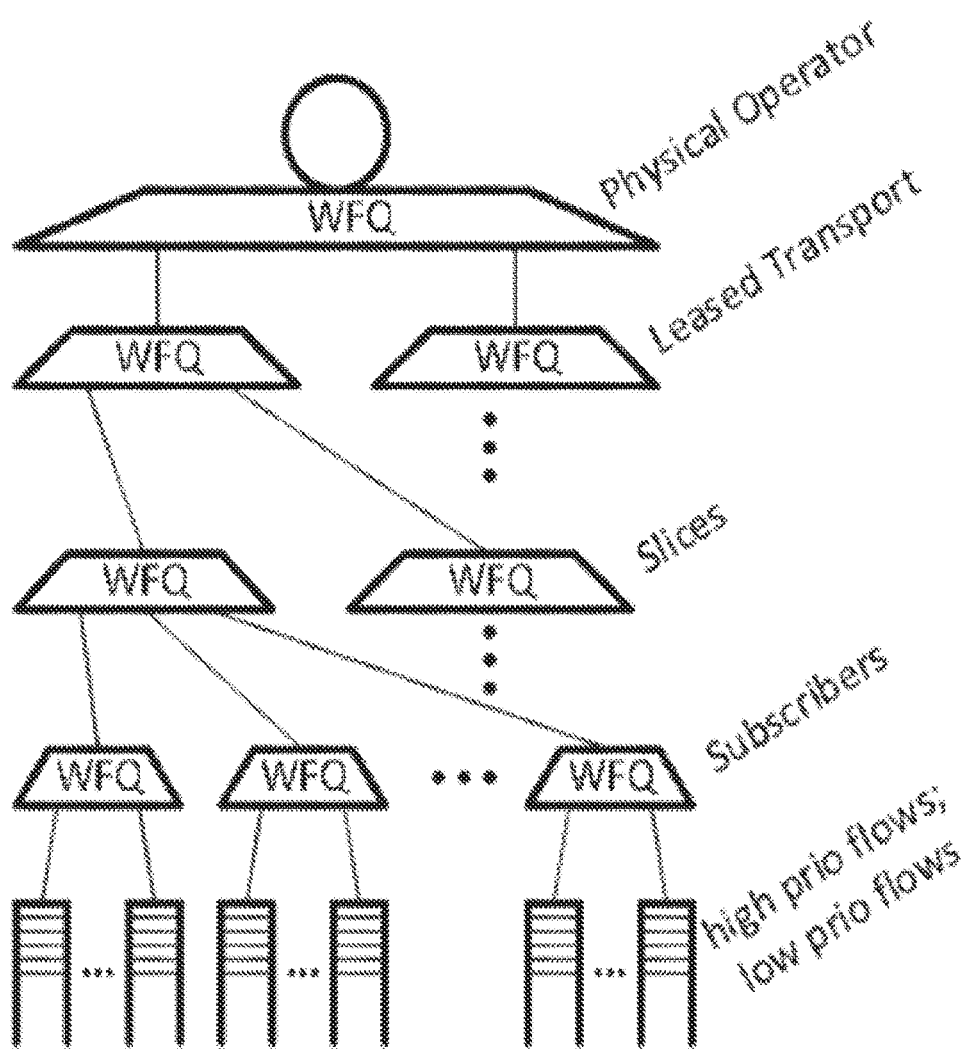
FIG. 2 schematically illustrates a HQoS scheduler with multiple hierarchical levels.

FIG. 2 illustrates a typical implementation of an HQoS scheduler. The HQoS scheduler comprises a hierarchy of physical queues and schedulers configured to share resources among TAs at different levels. At each level, one or more schedulers implement resource sharing policies defined by the network operator for TAs of the same level. For example, a level may comprise TAs for different operators, different leased transports, different network slices, different users or different subflows of a user. At the "operator" level, for example, the scheduler implements policies for sharing resources among different operators. For example, the resources for two operators, denoted Operator A and Operator B, can be shared at a 3-to-1 ratio. Each operator may have several leased transports that are assigned shares of the overall resources assigned to that operator. A scheduler at the "leased transport" level implements policies for resource sharing between leased transports. A leased transport may, in turn, be virtualized to carry traffic for a number of network slices. A scheduler at the "network slice" level implements policies for resource sharing resources among different network slices. Each network slice, in turn, may serve a plurality of subscribers (or groups thereof). Resource sharing among classes of subscribers of each of the network slices is implemented by a scheduler at the "subscriber" level. Finally, a scheduler at the "packet flow" level may implement resource sharing among the different flows of each subscriber in order to allocate different amounts of resource to flows of different types (e.g., to provide more resources to high priority flows relative to low priority flows). For example, a gold class of subscribers may be given a greater share of the shared resources than a silver class of subscribers, and streaming traffic may be given a greater share of the shared resources than web traffic. By defining resource sharing polices at each level, it is possible to implement complex resource sharing strategies.

The scheduler at each level implements a queue scheduling algorithm to manage the resource sharing and schedule packets in its queues. When congestion occurs, the queue scheduling mechanism provides packets of a certain type with desired QoS characteristics such as the bandwidth, delay, jitter and loss. The queue scheduling mechanism typically works only when the congestion occurs. Commonly used queue scheduling mechanisms include Weighted Fair Queuing (WFQ), Weighted Round Robin (WRR), and Strict Priority (SP). WFQ is used to allocate resources to queues taking part in the scheduling according to the weights of the queues. SP allocates resources based on the absolute priority of the queues.

Any of the schedulers may apportion the shared resources in any manner that may be deemed appropriate. For example, while the resources were discussed above as being shared between two operators at a ratio of three-to-one, one of the operators may operate two network slices, and the HQoS resource sharing scheme may define resource sharing between those two slices evenly (i.e., at a ratio of one-to-one). Subsequent schedulers may then further apportion the shared resources. For example, the HQoS resource sharing scheme may define resource sharing for both gold and silver subscribers at a ratio of two-to-one, respectively. Further still, the HQoS resource sharing scheme may define resource sharing for web flows and download flows at a ratio of two-to-one. Thus, each WFQ may be designed to make a suitable apportionment of the shared resources as may be appropriate at its respective level of the hierarchy.

In one approach to scheduling, known as per PV (PPV), packets are marked with a PV that expresses the relative importance of the packet flow to which the packet belongs and the resource sharing policies between different TAs are determined by the PV assigned to the packets. In this approach, the assigned PVs are considered by the scheduler at a bottleneck in the network to determine what packets to forward. Generally, packets with higher value are more likely to be forwarded during periods of congestion while packets with lower value are more likely to be delayed or dropped or delayed.

Figure 3:
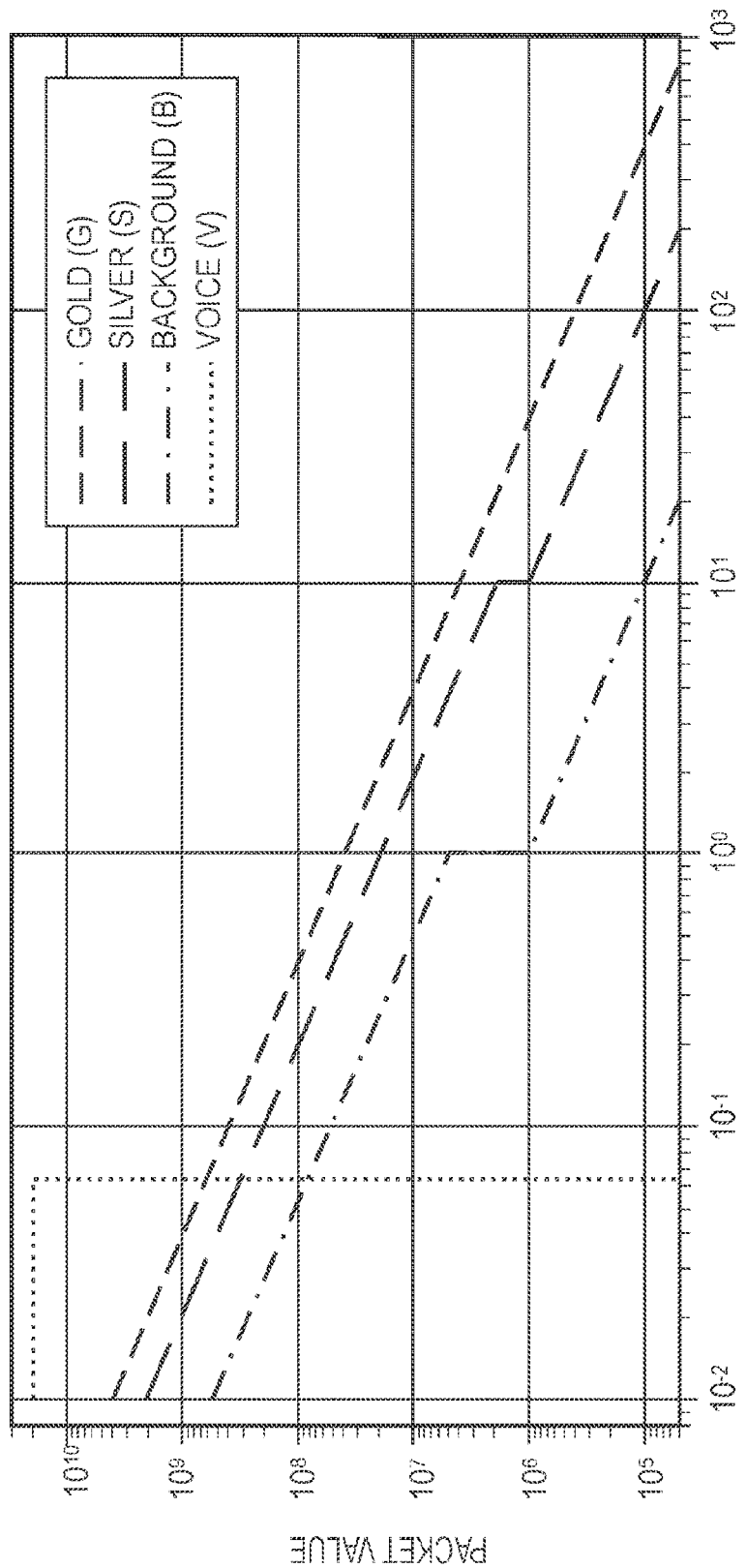
FIG. 3 illustrates TVFs for four packet flows with different QoS requirements.

The PPV approach uses Throughput Value Functions (TPVs) to determine resource sharing policies among different TAs. A TVF is used by the packet marker to match a throughput value to a PV. FIG. 3 illustrates examples of four TVFs for gold users (G), silver users (S), voice (V) and background (B). Each TVF defines a relation between PV and throughput. In each TVF, higher throughput maps to lower PVs.

The packet marker 30 at the gateway 20 or other network node uses the TVF to apply a PV to each packet and the scheduler at a bottleneck uses the PV to determine what packets to schedule. For each packet, the packet marker selects a uniform random rate r between 0 and the maximum rate for the TA. The packet marker then determines the PV based on the selected rate r and the TVF for the TA. The assignment of a PV based on a uniform random rate ensures that all TAs will be allocated resources during periods of congestion. Packets marked with a gold TVF, for example, will not always receive a higher PV than packets marked with a silver TVF, but will have a greater chance of receiving a higher PV.

In one implementation, a core stateless resource sharing mechanism called Hierarchical Per PVs (HPPV) implements HQoS by only modifying packet marking algorithms without any changes to the schedulers at the switches or routers 40. No knowledge of the resource sharing policies is required by the scheduler. With this approach, HQoS can be implemented with simple PPV schedulers that determine the handling of a packet based only on its PV. An advantage of this approach is that new policies can be introduced by reconfiguring packet marking without making any changes to the scheduler.

Another core stateless resource sharing solution is disclosed in a related application titled "HQoS Marking For Many Subflows", which is filed on the same date as this application. This application discloses a method of packet marking for a HQoS scheme that ensures weighted fairness among a plurality of subflows in a TA. This application is incorporated herein in its entirety by reference. In this application, an aggregate TVF is defined for the aggregate of all subflows in a TA and packets from multiple subflows are marked at a single point based on the aggregate TVF. For each packet, the packet marker takes a uniform random rate r as an input and computes an adjusted rate based on normalized weights for each subflow. The adjusted rate is then used with the aggregate TFV to determine the PV of the packet.

One aspect of the present disclosure is to provide a simple solution for implementing any number of policy levels in a HQoS hierarchy by marking packets at a single location. A packet marker at a single point (e.g., gateway) encodes the resource sharing policy for a plurality of packet flows through the single point into a single PV. The HQoS policy is then realized by using simple PPV schedulers at the bottlenecks in the network.

To implement packet marking for multiple hierarchical levels in a HQoS hierarchy at single point, a hierarchy of WFQ and SP marker components are organized into a marker graph 60. The marker graph 60 includes a source node 62, a plurality of intermediate nodes corresponding to the SP and WFQ marker components, and a marker node 66. The intermediate nodes are referred to herein as rate transformation node 64s for reasons that will become apparent. The source node 62 of the graph determines a random bitrate for a packet in a packet flow. That random bitrate is routed through the marker graph 60 from the source node 62 through one or more rate transformation node 64s to the marker node 66. The random bitrate is transformed at each rate transformation node 64 according to the existing WFQ and SP components. The marker node 66, also referred to as the TVF node, uses the transformed rate received as input to the marker node 66 to determine the PV.

Figure 4:
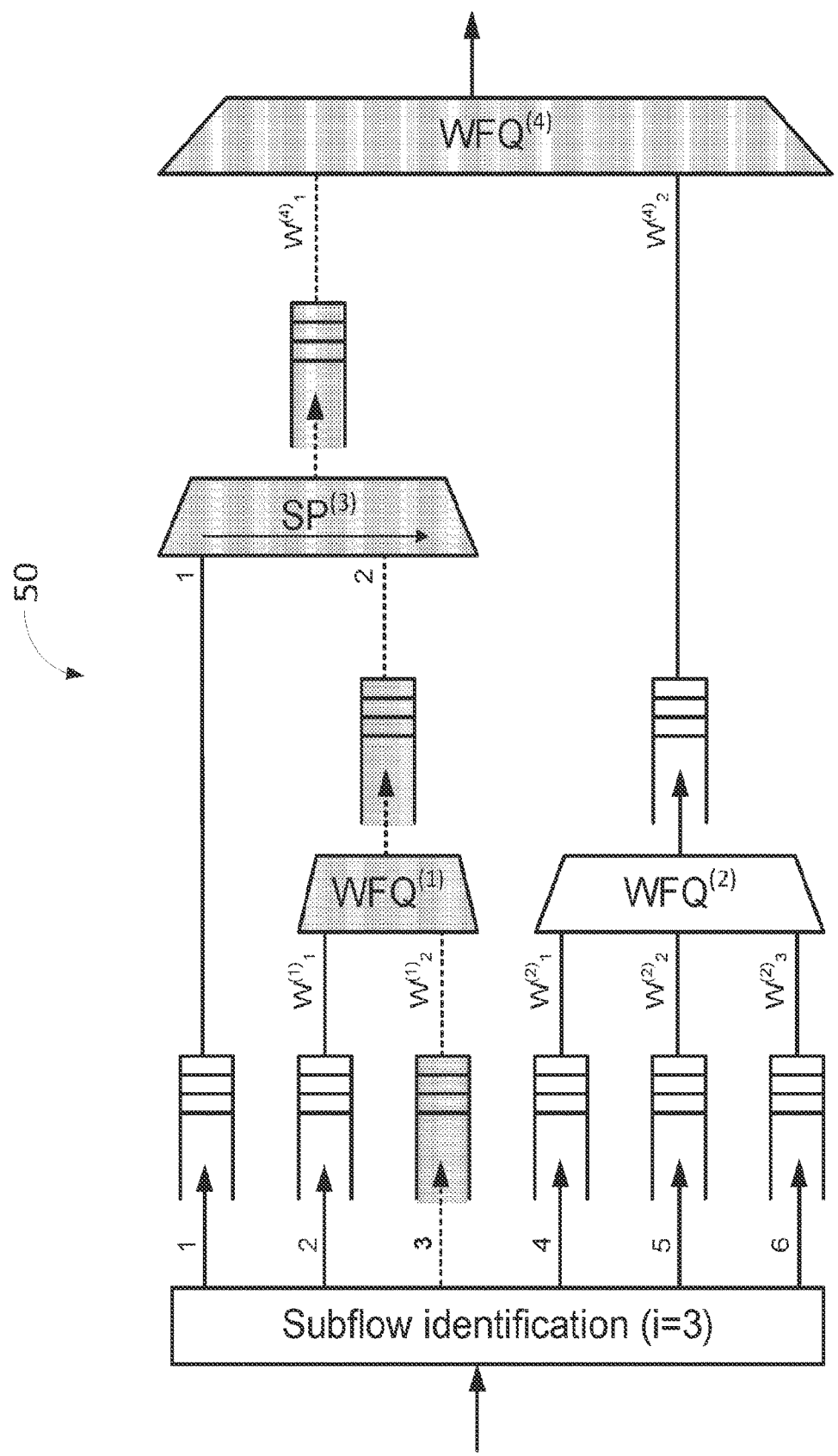
FIG. 4 illustrates an exemplary HQoS scheduler for six packet flows.
Figure 5:
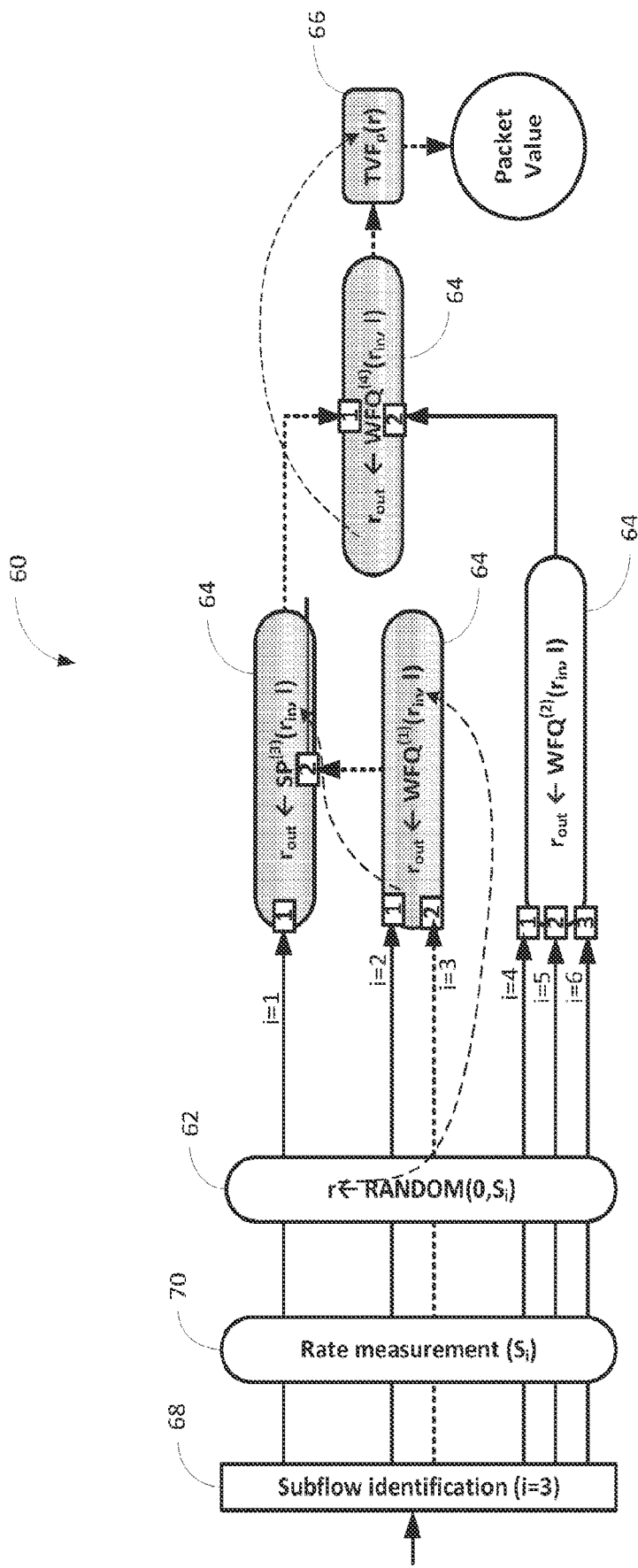
FIG. 5 illustrates a marker graph corresponding to the HQoS scheduler in FIG. 4.

A HQoS scheduler 50 with a hierarchy of WFQ and SP schedulers can be translated into a marker graph 60 by replacing each scheduler with a marker component, which is represented in the graph as a rate transformation node 64. FIGS. 4 and 5 depict an example of a traditional HQoS scheduler 50 and its analogous HQoS marker graph 60. When comparing the two, it can be observed that the connections in the traditional HQoS scheduler 50 are the same as the connections in the marker graph 60. It can be also observed that each unique path through the marker graph 60 corresponds to a packet flow path in the HQoS scheduler 50 and represents a sequence of rate transformation to be applied to the packet flow. This sequence of rate transformations encodes the policies applied to that packet flow. As an example, the shaded components and dotted lines in FIGS. 4 and 5 show the path of a packet belonging to subflow 3.

The marker graph 60 comprises a source node 62, a plurality of rate transformation nodes 64 and a marker node 66 as previously described. The source node 62, as previously described selects a uniform random rate r for each packet arriving at the network node (e.g. gateway 20). The rate transformation node 64s 64 are configured as either SP nodes or WFQ nodes depending on the operator policy. In this example, there are four rate transformation nodes 64, each corresponding to one of the schedulers shown in FIG. 4. The rate transformation nodes 64 are denoted as WFQ(1), WFQ(2), SP(3) and WFQ(4). The output of the final rate transformation node 64, WFQ(4), is connected to the marker node 66, which is preconfigured with the ATVF for the six packet flows. The marker node 66 is configured to mark the packet with a PV based on the transformed rate received from WFQ(4) and the ATVF.

FIG. 5 also illustrates a selection node 70 and measurement node 70 for completeness. The selection node 70 determines a path through the marker graph 60 through which the uniform random rate will be propagated based on the packet flow ID. Each incoming packet flow maps to a particular input at a particular rate transformation node 64. Essentially, the selection node 70 selects the rate transformation node 64 and input to which the uniform random rate is sent based on the packet flow ID. The measurement node 70 is not directly involved in packet marking, but rather is used to update the states of the rate transformation nodes 64 periodically or from time to time. The measurement node obtains measurements $S_i$ for each of the incoming packet flows and forwards these measurements to respective inputs at respective rate transformation nodes 64 during a procedure to update the states of the rate transformation nodes 64. The update procedure is described in more detail below.

Each rate transformation node 64 takes a rate value as input and calculates a transformed rate as output. For a traffic mix with n traffic aggregates where $P[TA_i]$ is the probability that $TA_i$ is selected (the packet to be marked belongs to this traffic aggregate) and the input rates for each $TA_i$ are chosen uniformly at random from the range $[0,S_i]$ ($S_i$ is the instant rate of $TA_i$), the output rates of WFQ or SP components follow a uniform distribution over the range $$\left[0, \sum\nolimits_{k=1}^{n} S_k\right],$$

where $$\sum\nolimits_{k=1}^{n} S_k$$

represents the total rate of all the traffic flowing through the given component. In the case of equal sized packets $$P[TA_i] = S_i / \sum\nolimits_{k=1}^{n} S_k$$

Note that this traffic can also be considered as a traffic aggregate at a higher level and other WFQ or SP components can be applied on it.

In this model, HQoS policies are encoded as a sequence of rate transformations and the marker graph 60 translates the HQoS policy into a single PV. The marker-graph comprises a directed acyclic graph G=(V, E) where V comprises the set of rate transformation nodes 64, source node 62 and marker node 66 and E is a set of edges connecting the nodes. For packets of subflow i, the starting node represents a random rate selection from range $[0,S_i]$ and this node has n outgoing edges to rate transformation nodes 64.

Instead of routing a packet through a series of hierarchical queues at the scheduler, the HQoS packet marker routes a uniform random rate selected for a packet through the marker graph 60 along a path selected based on the packet flow identifier and transforms the random rate at each rate transformation node 64 along the selected path. Upon reaching the marker node 66, the packet is marked using an aggregate TVF for the entire set of packet flows. Based on this packet marking, the hierarchical schedulers at the bottlenecks in the network can be replaced by simple PPV schedulers.

HQoS packet marking starts by identifying the packet flow to which the packet belongs. Then a random rate r is determined, which is a uniform random number in $[0,S_i]$. This rate r is transformed (one or more times) by routing it through the marker graph 60 according to the packet flow identifier (ID) until the marker node 66 of the graph is reached and the PV is determined. Dashed lines in FIG. 5 show how r is repeatedly transformed for packet flow 3. The local index l at each rate transformation node 64 is determined based on the input port of the node at which r arrives. Note that the numbering of the input ports l is the same as for the HQoS scheduler 50. The marker node 66 marks the packet with a PV based on the final transformed rate output the last marker component, e.g., rate transformation node.

FIGS. 6-10 illustrates exemplary pseudo code for implementing a packet marker using a marker graph 60 as herein described. The variables used have the following meanings:

n is a number of flows;

G (V, E) is the marker graph 60;

$S_i$ is the rate measurement for the ith packet flow at the starting node;

m is an index for the nodes in the marker graph 60;

l is a local index for the input ports at each rate transformation node 64 in the marker graph 60;

m,l indicates the mth node of the graph, reached via the lth input port;

adj is a function to determine the next node of the graph (i.e., the outgoing edge);

apply is the application of the rate transformation function; and f is a function to determine PV based on the aggregate TVF;

$S_l$ is the rate measurement for the TA at the lth input port of a rate transformation node 64;

j is a region in range of throughput values from $$\left[0, \sum\nolimits_{k=1}^{n} S_k\right];$$

$B_j$ indicates the starting point of region j;

$\delta_j$ indicates the width of region j;

R is a rate determination matrix;

W is a normalized weight matrix; and o is a reordering vector indicating a rank of the subflows at a node m in the marker graph 60.

Processing begins at the source node 62, denoted s (line 2). A random rate r is selected for a packet arriving at the source node 62 (line 3) and the next node in the path is computed based on the packet flow index i or other packet flow ID (line 4). Lines 5-7 describe the rate transformations performed as rate r is propagated through the marker graph 60 along the selected path. At each rate transformation node 64, the input rate r is adjusted based on the input port l at which the input rate $r_{in}$ was received (line 6). The next node in the path is then calculated (line 7). The processing represented by lines 6 and 7 is repeated at each rate transformation node 64 until the marker node 66 is reached. Once the marker node 66 is reached, the final transformed rate r output by the last rate transformation node 64 and aggregate TFV is used to determine the PV (line 8).

Code listing 2, shown in FIGS. 7, illustrates an exemplary apply function for a rate transformation node 64 implementing SP scheduling for the packet flows flowing through that node. A rate transformation node 64 implementing SP allocates resources to subflows based on absolute priority. The rate measurement node takes $r_{in}$ as an input and returns a transformed rate $r_{out}$ as output. Generally, the rate transformation node 64 adds a rate offset $L_{l-1}$ to the input rate $r_{in}$ to yield the output rate $r_{out}$, where l is the local index of the subflow in priority order. The rate transformation nodes 64 is configured with a vector of rate offsets $[L_0, L_1, \ldots L_{n-1}]$ for each subflow traversing that node. The rate offsets constitute state information representing a current state of the rate transformation node 64. This state information is updated periodically as herein described based on measured rates $S_i$ of the incoming packet flows.

Code listing 3, shown in FIG. 8, illustrates an exemplary apply function for a rate transformation node 64 implementing WFQ scheduling for the packet flows flowing through that node. A rate transformation node 64 implementing WFQ allocates resources to subflows taking part in the scheduling according to the weights of the subflows. The rate transformation node 64 takes a local TA index l and a rate $r_{in}$ as inputs and returns a transformed rate $r_{out}$ as output. The TA index l is a local index that identifies the input port on which the rate $r_{in}$ is received. The TA index l is in the range [1,n] where n is the number of TAs flowing through the rate transformation node 64. The transformed rate $r_{out}$ is in the range $$\left[0, \sum\nolimits_{k=1}^{n} S_k\right].$$

In one implementation, the range of possible values of $r_{out}$ is divided into n regions equal to the number of TAs flowing through the rate transformation node 64. Each region j is associated with a starting value $B_{j-1}$. The rate transformation node 64 is configured with a reordering vector o, a region determination matrix R and a normalized weight matrix. W. The reordering vector comprises a vector of the TA indices l in ranked order based on a ratio $S_l/w_l$, where $S_l$ is the measured rate of the sublfow l and $w_l$ is a weight assigned by the operator. The region determination matrix R comprise a matrix used to map the input rate $r_{in}$ to corresponding values in a region j in the possible range of throughput values. Each element $R_{j,i}$ indicates when region j is used for sublfow $o_i$, where $o_i$ indicates a subflow l at the ith position in the reordering vector. In this case, the index i indicates a rank of the subflow. The normalized weight matrix W provides normalized weights for each sublfow $o_i$ in each region j. Each element $W_{j,i}$ is a normalized weight for sublfow $o_i$ in region j. The reordering vector o, region determination matrix R and a normalized weight matrix W comprise state information representing a current state of the rate transformation node 64. This state information is updated periodically based on measured rates $S_i$ of the packet flows as hereinafter described.

When a packet arrives at an input port l, the rate transformation node 64 determines the rank i of the sublfow l based on the reordering vector (line 2). The rate transformation node 64 then maps the input rate $r_{in}$ to a region j based on the position i of the subflow in the reordering vector (line 3). Based on the mapping, the rate transformation node 64 computes an adjusted rate $r_{out}$ (line 4). More particularly, the rate transformation node 64 subtracts $R_{j-1,i}$ from the input rate $r_{in}$ and divides the result by $W_{j,i}$ to get a weighted rate, which is then added to $B_{j-1}$ which is the starting throughput value for the region j.

As noted above, the state information for the rate transformation nodes 64 is updated periodically based on rate measurements $[S_1, S_2, \ldots S_n]$ for the packet flows. The rate measurements $[S_1, S_2, \ldots S_n]$ are not propagated with every packet to the rest of marker graph 60, but rather are used to update the marker states of the rate transformation nodes 64. During the update of marker states, each S, is propagated along a respective path of the marker graph 60. Each rate transformation node 64 treats the incoming $S_l$ according to the local index of the input port and propagates the sum of all incoming $S_l$ s at its outgoing edge. Each rate transformation node 64 updates its internal state based on the $S_l$ s received on its respective inputs. Afterward, each node summarizes the incoming rate measurement and propagates the sum on its outgoing edge to the next node. A node only performs state update, when all the rate measurements are available in its input ports.

This update can be implemented in an independent control thread/control node. The marker graph 60 is preconfigured to that node. Periodically, the node reads the rate measurements, calculates the updated internal state of the marker graph 60 nodes and updates them in a coordinated manner.

Code listing 4, shown in FIG. 9, illustrates an update procedure for updating the rate offsets used by a rate transformation node 64 to implement SP scheduling. The update routine receives subflow rate measurements $[S_1, S_2, \ldots S_n]$ for the TAs at each input and uses the subflow rate measurements to compute a vector of rate offsets $[L_0, L_1, \ldots L_{n-1}]$. Note that the subflow rate measurements are for the subflows at respective inputs and are received from a preceding node. The rate offsets are ordered in priority order of the subflows. The rate offset $L_0$ for the highest priority flow is set to 0 so that the output rate for the highest priority flow is equal to the input rate (line 2). For each subsequent rate offset, the rate measurement $S_l$ is added to the previously computed rate offset $L_{l-1}$ to obtain the next rate offset $L_l$ (lines 3-4). The rate offsets ensure that the random rates assign to each sublfow are bounded to a specific range. For subflow 1, the range is $[0, S,]$, for subflow 2 the range is $[S_0, S_2]$ and so forth up to subflow n. For subflow n the range is $[S_{n-1}, S_n]$.

Code listing 5, shown in FIG. 10, illustrates exemplary processing for updating state information used by a rate transformation node 64 to implement SP scheduling. The update routine receives subflow rate measurements $[S_1, S_2, \ldots, S_n]$ for the packet flows at each input. Note that the subflow rate measurements are for the subflows at each input port l to that node and are received from a preceding node. The rate measurement node calculates the reordering matrix o based on the subflow rate measurements $[S_1, S_2, \ldots, S_n]$ and a weight vector w provided by the operator (Proc. 5, lines 1 and 2). As previously noted, the reordering vector o arranges the indices of the subflows in order based on a ratio $S_l/w_l$, where $S_l$ is the measured rate of the sublfow l and $w_l$ is a corresponding weight $w_l$ assigned by the operator. The weight vector w may be configured as part of the resource sharing policy of the network. Accordingly, these weights may be changed when the network implements new resource sharing policies. That said, these weights are expected to generally change infrequently, if at all. The starting value $B_0$ for the first of n regions is set (line 4). After initializing the rate determination matrix R (lines 5-6), the rate transformation node 64 calculates the normalized weight matrix W (lines 7-9). For each region j, the rate transformation matrix computes the width $\delta$ and boundary $B_j$ of the region j based on the normalized weights (lines 11-12). Additionally, the rate transformation node 64 calculates the rate determination matrix R (lines 13-14).

Based on the forgoing, it can be observed that the rate transformation nodes 64 are updated periodically or from time to time based on rate measurements $S_l$ of the subflows received at each input port l. It receives rates $r_{in}$ from 0 to $S_l$ on each input port l and produces a rate $r_{out}$ from 0 to $$\sum_{k=1}^{n} S_k$$

at its output, where n is the number of subflows. If the rate transformation node 64 receives uniform random rates on its inputs, it produces uniform random rates in its outputs (assuming that packets are of equal size). If packets vary in size, each sample in the distribution can be weighted based on the size of the packet to which it belongs.

A simple example may help to illustrate the operation of the packet marker as herein described. This example illustrates operation of the marker graph 60 shown in FIG. 5, which is based on the HQoS scheduler 50 in FIG. 4. The scheduler implements a resource sharing policy for 6 packet flows using four scheduling queues denoted WFQ(1), WFQ(2), SP(3) and WFQ(4). The rates and relative weights for each packet flow arriving at the scheduler are shown in Table 1 below.

TABLE 1

Rates and Weights for Packet Flows

| Packet Flow ID | Rate | Weight |
|---|---|---|
| 1 | 5 | pri |
| 2 | 2 | 2 |
| 3 | 3 | 1 |
| 4 | 6 | 2 |
| 5 | 2 | 1 |
| 6 | 4 | 1 |

Flows 2 and 3 are connected to WFQ(1). Flows 4, 5 and 6 are connected to WFQ(2). Flow 1 and the output of WFQ(2) are connected to SP(3). The outputs of SP(3) and WFQ(2) are connected to WFQ(4). The weights assigned to the queues at each scheduler are shown in Table 2.

TABLE 2

Relative Weights of Scheduler Queues

| WFQ(1) | 2/1 |
|---|---|
| WFQ(2) | 2/1/1 |
| SP(3) | 1/2 |
| WFQ(4) | 1/2 |

Figure 11A:
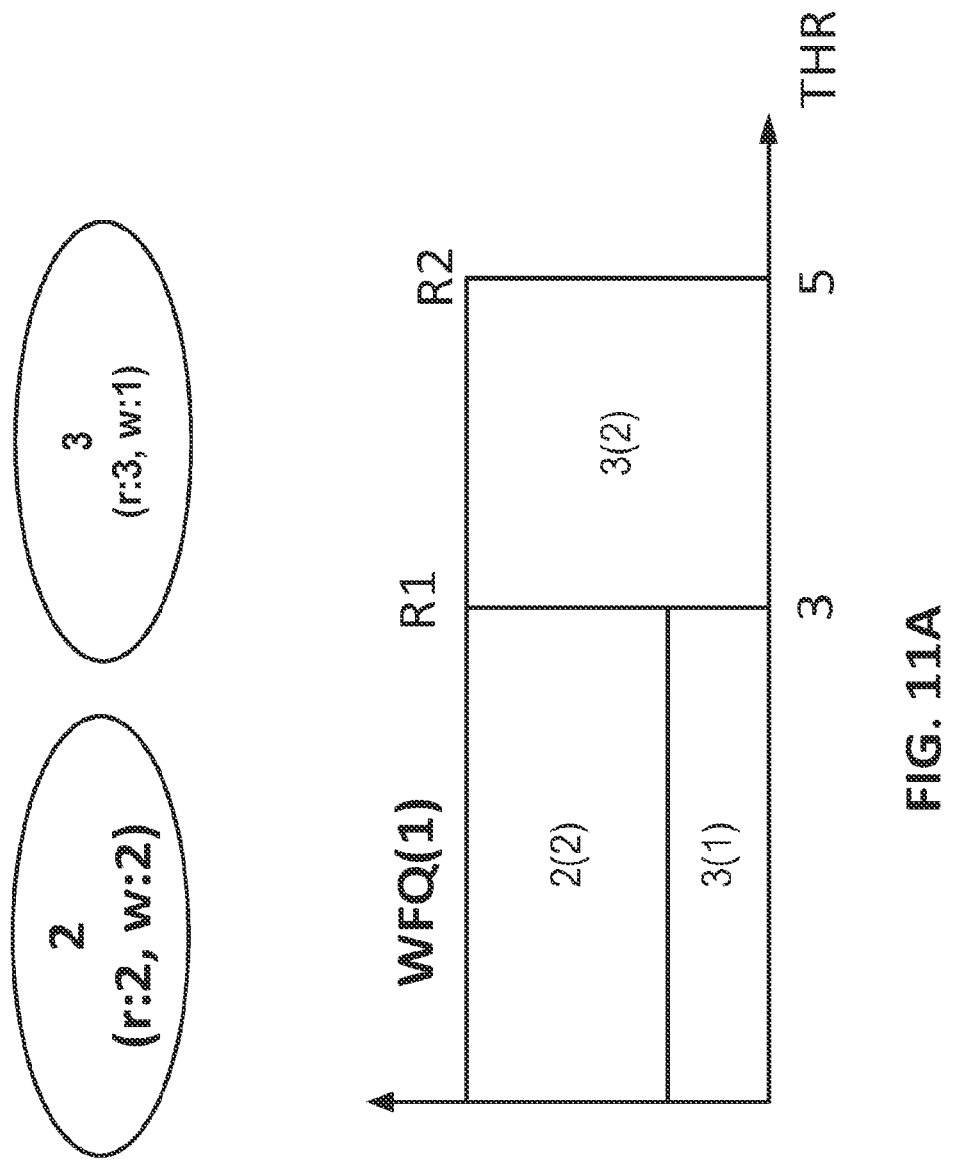
FIGS. 11A-11D illustrate one example resource management using a marker graph.

FIGS. 11A-11D illustrates resource sharing based on the policy embodied in Tables 1 and 2. WFQ(1) divides the throughput range of [0, 5] into two regions as shown in FIG. 11A. Based on the ratios $S_l/w_l$ of the subflows computed from Table 1, packet flow 2 is allocated resources in region 1 (R1) and packet flow 3 is allocated resources in both region 1 (R1) and region 2 (R2). In R1, resources are shared between flows 2 and 3 at a ratio of 2 to 1 based on Table 2. In R2, all the resources are used by flow 3. The total rate for flow 2 is 2 Mbps. The total rate for flow 3 is 3 Mbps.

Figure 11B:
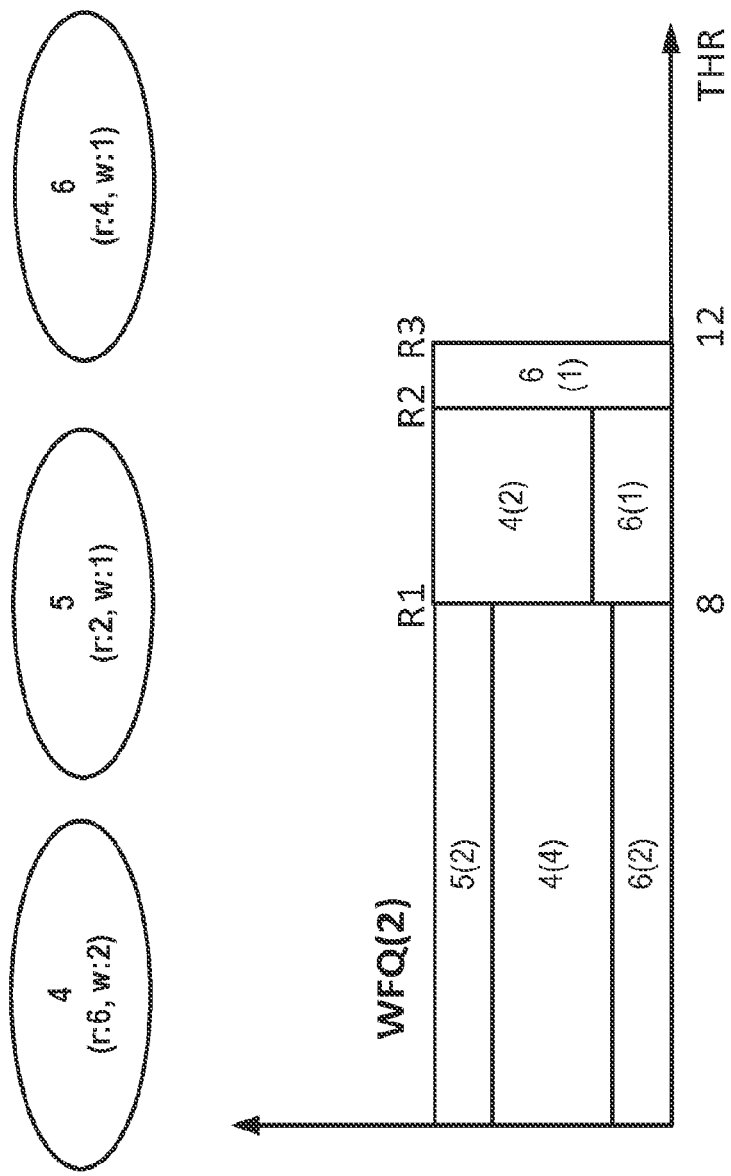

WFQ(2) divides the throughput range of [0, 12] into three regions as shown in FIG. 11B. Based on the ratios $S_l/w_l$ of the subflows computed from Table 1, packet flow 5 is allocated resources in region 1 (R1), packet flow 4 is allocated resources in regions 1 and 2 (R1 and R2), and packet flow 6 is allocated resources in all three regions. In R1, resources are shared between flows 4, 5 and 6 in the ratio 2:1:1 based on Table 2. In R2, resources are shared between flows 4 and 6 in the ratio 2:1 based on Table 2. In region 3 (R3), all the resources are used by flow 6. The total rate for flow 4 is 6 Mbps. The total rate for flow 5 is 2 Mbps. The total rate for flow 6 is 4 Mbps.

Figure 11C:
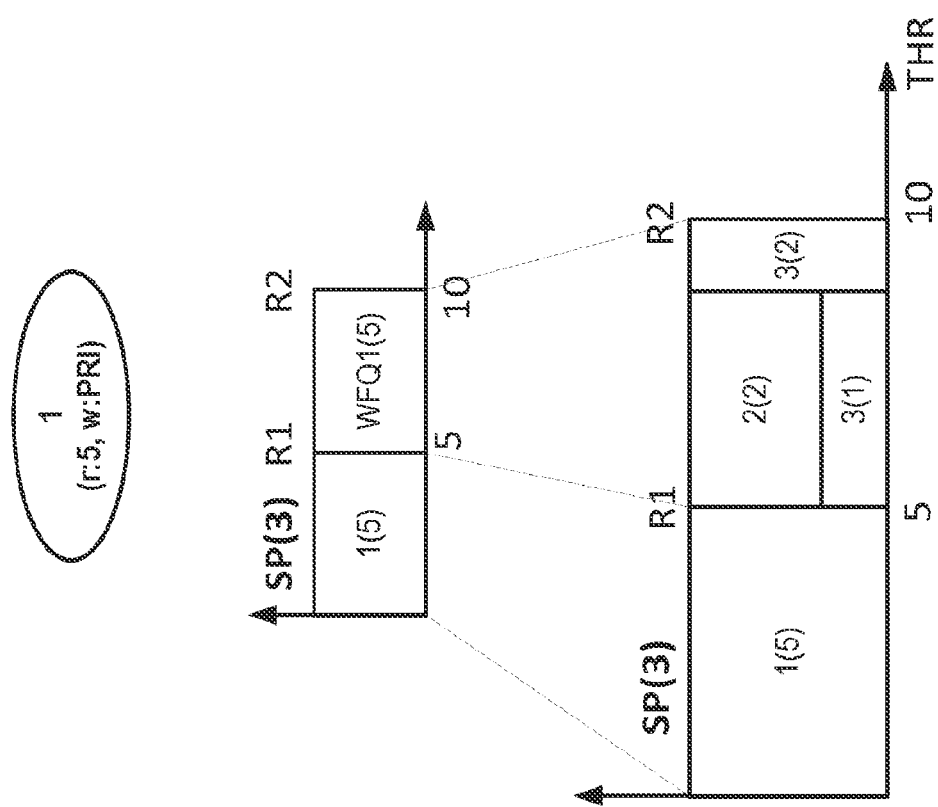

SP(3) divides the throughput range of [0, 10] into two regions as shown in FIG. 11C. In R1, all resources are used by flow 1, which is a priority flow. In region 2, all resources are used by the TA output from WFQ(1). The total rate for flow 1 is 5 Mbps. The total rate for combined flows 2 and 3 is also 5 Mbps.

Figure 11D:
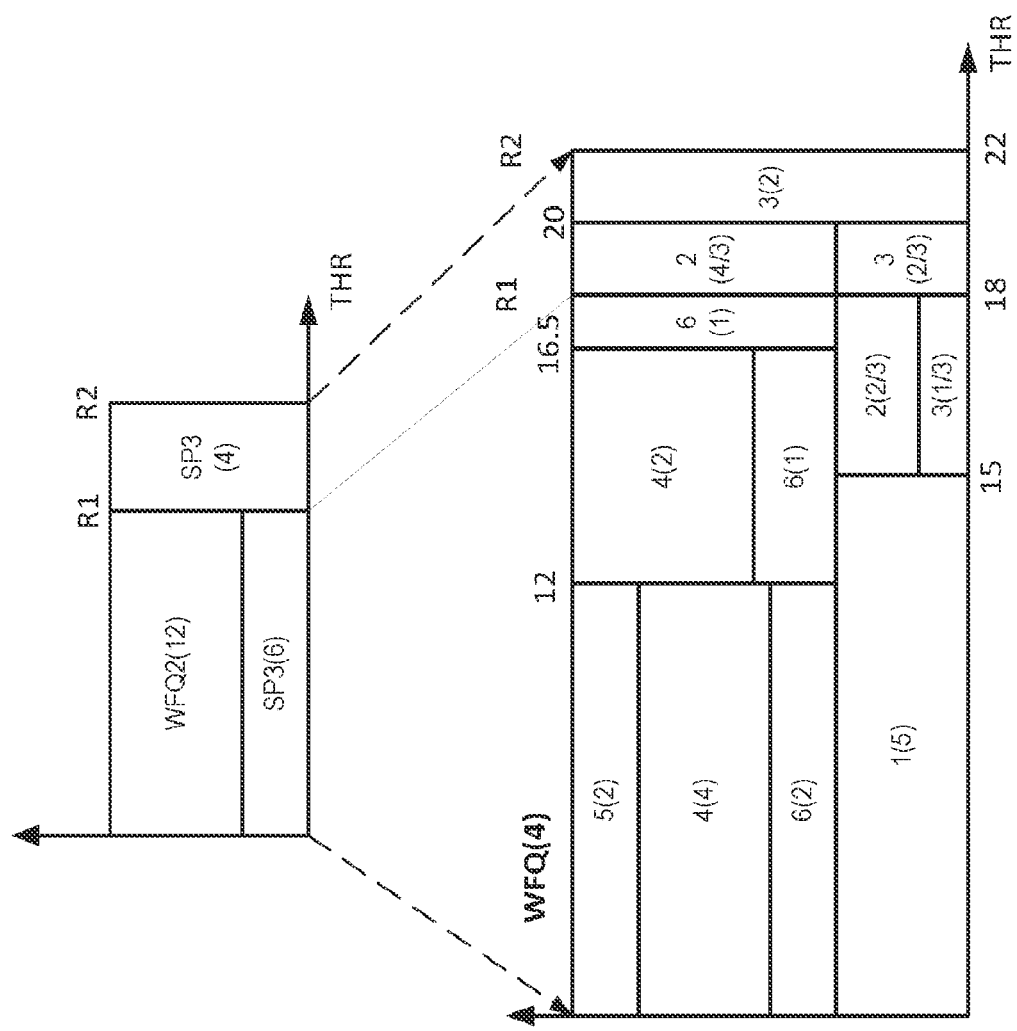

Finally, WFQ(4) divides the throughput range of [0, 22] into two regions as shown in FIG. 11D. Based on the ratios $S_i/w_i$ of the subflows computed from Table 1, the TA from WFQ(2) is allocated resources in region 1 (R1) and the TA from SP(3) is allocated resources in both regions. In R1, resources are shared between the TA from SP(3) and the TA from WFQ(2) in a ratio of 1:2 based on Table 2. In this region, the TA from SP(3) is allocated 6 Mbps and the TA from WFQ(2) is allocated 12 Mbps. The allocation for the TA from SP(3) is consumed primarily by flow 1, which is a priority flow leaving only 1 Mbps for flows 2 and 3. The resources in R2 are allocated entirely to flows 2 and 3 in SP(3) so the total allocation to flow 2 is 2 Mbps and the total allocation to flow 3 is 3 Mbps.

Figure 12:
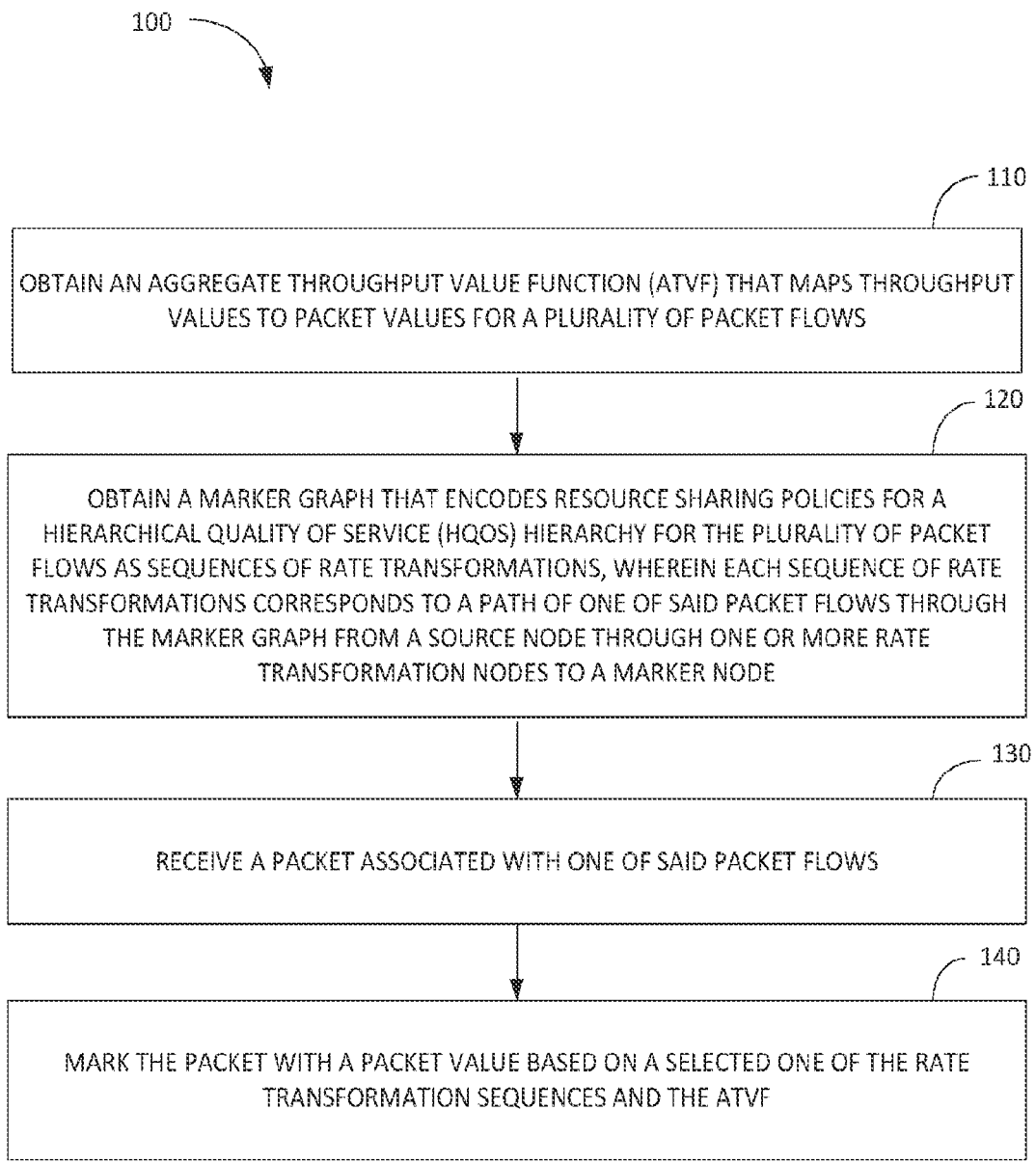
FIG. 12 illustrates a method of packet marking according to an exemplary embodiment.

FIG. 12 illustrates an exemplary method 100 of packet marking for multiple hierarchical levels. The packet marker obtains an Aggregate Throughput Value Function (ATVF) that maps throughput values to PVs for a plurality of packet flows (block 110). The packet marker further obtains a marker graph 60 that encodes resource sharing policies for a HQoS hierarchy for the plurality of packet flows as sequences of rate transformations, wherein each sequence of rate transformations corresponds to a path of one of said packet flows through the marker graph 60 from a source node 62 through one or more rate transformation nodes 64 to a marker node 66 (block 120). The packet marker receives a packet associated with one of the packet flows (block 130) and marks the packet with a PV based on a selected path through the marker graph 60 and the ATVF (block 140).

In some embodiments of the method 100, marking the packet with a PV based on a selected path through the marker graph 60 and the ATVF comprises randomly selecting an initial rate for the packet, selecting a path corresponding to one of the sequences of rate transformations based on a flow identifier for the packet flow, applying the selected sequence of rate transformations to transform the initial rate to a transformed rate, and marking the packet with a PV determined based on the transformed rate and ATVF.

In some embodiments of the method 100, applying the selected sequence of rate transformations to transform the initial rate to a transformed rate comprises, for each of one or more rate transformation nodes 64 in the selected path, receiving an input rate from a preceding node, wherein the preceding node comprises the source node 62 or a preceding rate transformation node 64, transforming the input rate to a transformed rate based on an input over which the input rate was received, and outputting the transformed rate to a succeeding node, wherein the succeeding node comprises a succeeding rate transformation node 64 or the marker node 66.

In some embodiments of the method 100, the initial rate is a rate selected randomly from a predetermined range determined based on the flow identifier.

In some embodiments of the method 100, the initial rate is a uniform random rate.

Some embodiments of the method further comprise periodically receiving rate measurements for the plurality of packet flows and, for each rate transformation node 64, periodically updating a rate transformation configuration for the rate transformation node 64 based on the rate measurements.

In some embodiments of the method 100, updating the rate transformation configuration comprises, for at least one rate transformation node 64, updating state information used by the rate transformation node 64 to input rates received on different inputs to the rate transformation node 64.

In some embodiments of the method 100, updating state information used by the rate transformation node 64 to transform input rates received on different inputs to the rate transformation node 64 comprises, for each input, computing a weight matrix and a rate determination matrix used for implementing weighted fair queuing In some embodiments of the method 100, updating state information used by the rate transformation node 64 comprises, for at least one rate transformation node 64, updating rate offsets applied to input rates received on the inputs to the rate transformation node 64 based on priorities associated with inputs.

Figure 13:
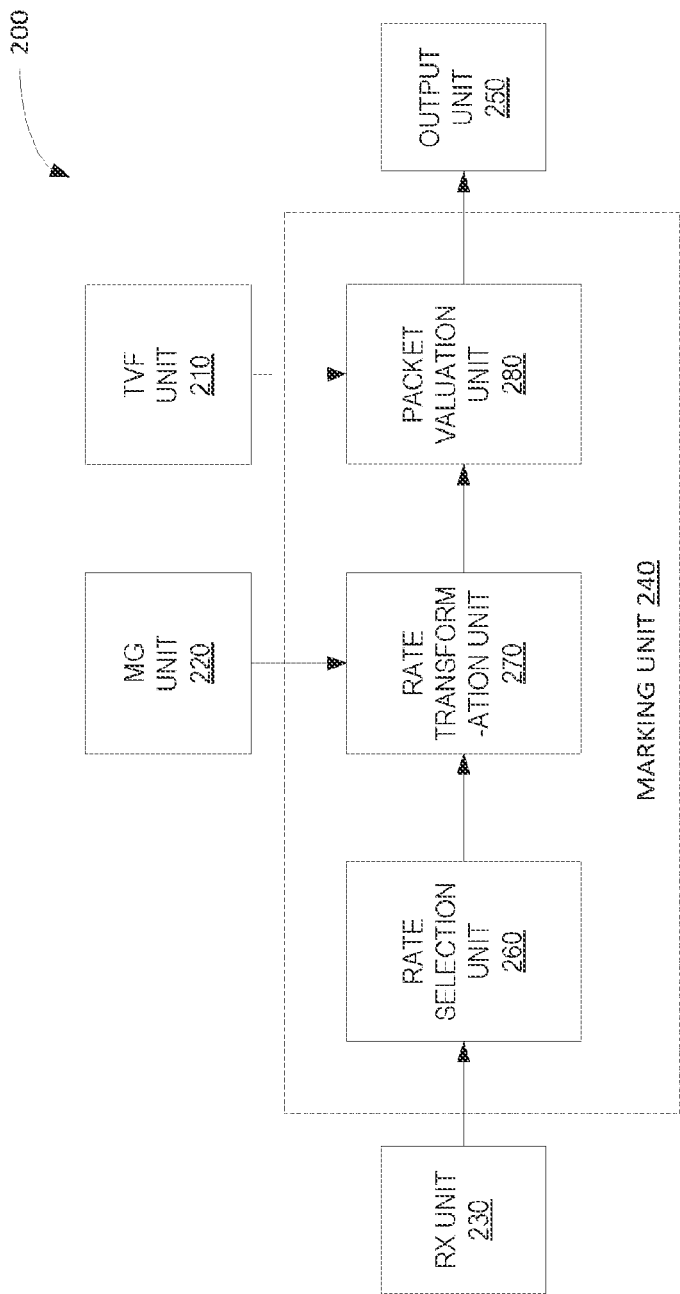
FIG. 13 is an exemplary network node configured to implement packet marking as herein described.

FIG. 13 illustrates an exemplary network node 200 according to an embodiment configured for marking packets. The network node 200 comprises a TFV unit 210, a marker graph (MG) unit 220, a receiving unit 230, a marking unit 240 and an optional output unit 250. The various units 210-250 can be implemented by one or more microprocessors, microcontrollers, hardware circuits, software, or a combination thereof.

The ATVF unit 210 is configured to obtain an Aggregate Throughput Value Function (ATVF) that maps throughput values to PVs for a plurality of packet flows. The marker graph 60 (MG) unit 220 is configured to obtain a marker graph 60 that encodes resource sharing policies for a HQoS hierarchy for the plurality of packet flows as sequences of rate transformations, wherein each sequence of rate transformations corresponds to a path of one of said packet flows through the marker graph 60 from a source node 62 through one or more rate transformation nodes 64 to a marker node 66 (block 120). The receiving unit 230 is configured to receive a packet associated with one of the packet flows. The marking unit 240 is configured to mark the packet with a PV based on a selected path of the marker node 66 and the ATVF. The output unit 250, when present, is configured to output the marked packet.

In one embodiment, the marking unit 240 comprises a rate selection unit 260, a rate transformation unit 270 and a valuation unit 280. The rate selection unit 260 is configured to select a uniform random rate for the received packet as an input rate. The rate transformation unit 270 is configured to apply a sequence of rate transformations to the input rate to compute a transformed rate based on the HQoS policies embodied in the marker graph 60. The rate selection sequence is selected based on a flow identifier associated with the packet flow to which the packet belongs. This is equivalent to selecting a path through the marker graph 60. The packet valuation unit 280 is configured to determine a PV for the packet based on an aggregate TFV for all of the packet flows.

Other embodiments include a computing device 300 (e.g., network node) configured for packet marking. The computing device 300 may perform one, some, or all of the functions described above, depending on the embodiment. In one example, the computing device 300 is implemented according to the hardware illustrated in FIG. 14. The example hardware of FIG. 14 comprises processing circuitry 320, memory circuitry 330, and interface circuitry 310. The processing circuitry 320 is communicatively coupled to the memory circuitry 330 and the interface circuitry 310, e.g., via one or more buses. The processing circuitry 320 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 320 may comprise a first processing circuit and a second processing circuit that are capable of executing functions in parallel.

The processing circuitry 320 may be programmable hardware capable of executing software instructions stored, e.g., as a machine-readable computer program 340 in the memory circuitry 330. The memory circuitry 330 may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 310 may be a controller hub configured to control the input and output (I/O) data paths of the computing device 300. Such I/O data paths may include data paths for exchanging signals over a communications network. For example, the interface circuitry 310 may comprise one or more transceivers configured to send and receive communication signals over one or more packet-switched networks, cellular networks, and/or optical networks.

The interface circuitry 310 may be implemented as a unitary physical component, or as a plurality of physical components that are contiguously or separately arranged, any of which may be communicatively coupled to any other, or may communicate with any other via the processing circuitry 320. For example, the interface circuitry 310 may comprise output circuitry (e.g., transmitter circuitry configured to send communication signals over a communications network) and input circuitry (e.g., receiver circuitry configured to receive communication signals over the communications network). Other examples, permutations, and arrangements of the above and their equivalents will be readily apparent to those of ordinary skill.

Figure 14:
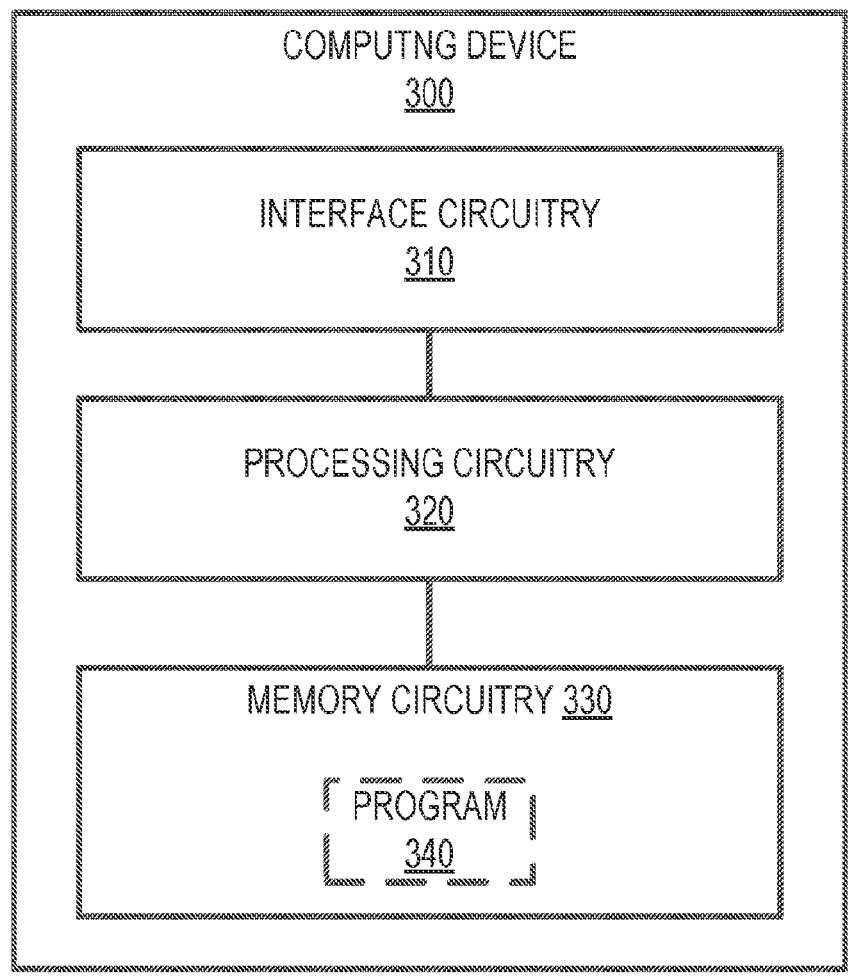
FIG. 14 is an exemplary computing device configured to implement packet marking as herein described.

According to embodiments of the hardware illustrated in FIG. 14, the processing circuitry 320 is configured to perform the method 200 illustrated in FIG. 12, the method 100 illustrated in FIG. 11.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Packet marking based on the marker graph 60 can be performed fast. After marking, packets can be put into a scheduler and the scheduler can be implemented as a simple PPV scheduler. No modifications to the scheduler are required to implement HQoS. Scheduling can be performed independent of the number of flow and without knowledge of the HQoS hierarchy or resource sharing policies at the scheduler.

Packet marking based on the marker graph 60 encodes the entire HQoS hierarchy into a single PV. HQoS policy is determined by the TVF. Packet marking as herein described is independent per TVF and can be parallelized.

Packet marking as herein described can be combined with the remarker solution in Resource Sharing in a Virtual Networking setting both in the input side (by changing how r is determined based on the incoming PV) and the output side (by using the calculated PV for the remarker). With this approach, a complex HQoS hierarchy (e.g., slicing) can be decomposed and the implementation of the whole HQoS hierarchy can be optimized based on processing capabilities and information availability.

What is claimed is:

1. A method of marking packets, the method comprising:
obtaining an Aggregate Throughput Value Function (ATVF) that maps throughput values to packet values for a plurality of packet flows;
obtaining a marker graph that encodes resource sharing policies for a Hierarchical Quality of Service (HQoS) hierarchy for the plurality of packet flows as sequences of rate transformations, wherein each sequence of rate transformations corresponds to a path of one of said packet flows through the marker graph from a source node through one or more rate transformation nodes to a marker node;
receiving a packet associated with one of said packet flows; and
marking the packet with a packet value based on a selected path through the marker graph and the ATVF.

2. The method of claim 1, wherein marking the packet with a packet value based on a selected path through the marker graph and the ATVF comprises:
randomly selecting an initial rate for the packet;
selecting, based on a flow identifier for the packet flow, a path corresponding to one of said sequences of rate transformations;
applying the selected sequence of rate transformations to transform the initial rate to a transformed rate; and
marking the packet with a packet value determined based on the transformed rate and ATVF.

3. The method of claim 2, wherein applying the selected sequence of rate transformations to transform the initial rate to a transformed rate comprises, for each of one or more rate transformation nodes in the selected path:
receiving an input rate from a preceding node, wherein the preceding node comprises the source node or a preceding rate transformation node;
transforming the input rate to a transformed rate based on an input over which the input rate was received; and
outputting the transformed rate to a succeeding node, wherein the succeeding node comprises a succeeding rate transformation node or the marker node.

4. The method of claim 1, wherein the initial rate is a rate selected randomly from a predetermined range determined based on the flow identifier.

5. The method of claim 1, wherein the initial rate is a uniform random rate.

6. The method of claim 1, further comprising:
periodically receiving rate measurements for the plurality of packet flows;
for each rate transformation node, periodically updating a rate transformation configuration for the rate transformation node based on the rate measurements.

7. The method of claim 6, wherein updating the rate transformation configuration comprises, for at least one rate transformation node, updating state information used by the rate transformation node to transform input rates received on different inputs to the rate transformation node.

8. The method of claim 7, wherein updating state information used by the rate transformation node to transform input rates received on different inputs to the rate transformation node comprises, for each input, computing a weight matrix and a rate determination matrix used for implementing weighted fair queuing.

9. The method of claim 6, wherein updating the state information used by the rate transformation node to transform input rates received on different inputs to the rate transformation node comprises, for at least one rate transformation node, updating rate offsets applied to input rates received on the inputs to the rate transformation node based on priorities associated with inputs.

10. A network node configured for marking packets with a packet value, the network node comprising:
interface circuitry for sending and receiving packets in one or more packet flows; and
processing circuitry configured to:
obtain an Aggregate Throughput Value Function (ATVF) that maps throughput values to packet values for a plurality of packet flows;
obtain a marker graph that encodes resource sharing policies for a Hierarchical Quality of Service (HQoS) hierarchy for the plurality of packet flows as sequences of rate transformations, wherein each sequence of rate transformations corresponds to a path of one of said packet flows through the marker graph from a source node through one or more rate transformation nodes to a marker node;
receive a packet associated with one of said packet flows; and
mark the packet with a packet value based on a selected path through the marker graph and the ATVF.

11. A non-transitory, computer-readable medium comprising executable instructions that, when executed by a processing circuitry in a network node, causes the network node to:
obtain an Aggregate Throughput Value Function (ATVF) that maps throughput values to packet values for a plurality of packet flows;
obtain a marker graph that encodes resource sharing policies for a Hierarchical Quality of Service (HQoS) hierarchy for the plurality of packet flows as sequences of rate transformations, wherein each sequence of rate transformations corresponds to a path of one of said packet flows through the marker graph from a source node through one or more rate transformation nodes to a marker node;
receive a packet associated with one of said packet flows; and
mark the packet with a packet value based on a selected path through the marker graph and the ATVF.

* * * * *